(No Model.)
J. W. GRAVES.
CYLINDRICAL COTTON BALE AND METHOD OF MAKING SAME.
No. 546,009. Patented Sept. 10, 1895.
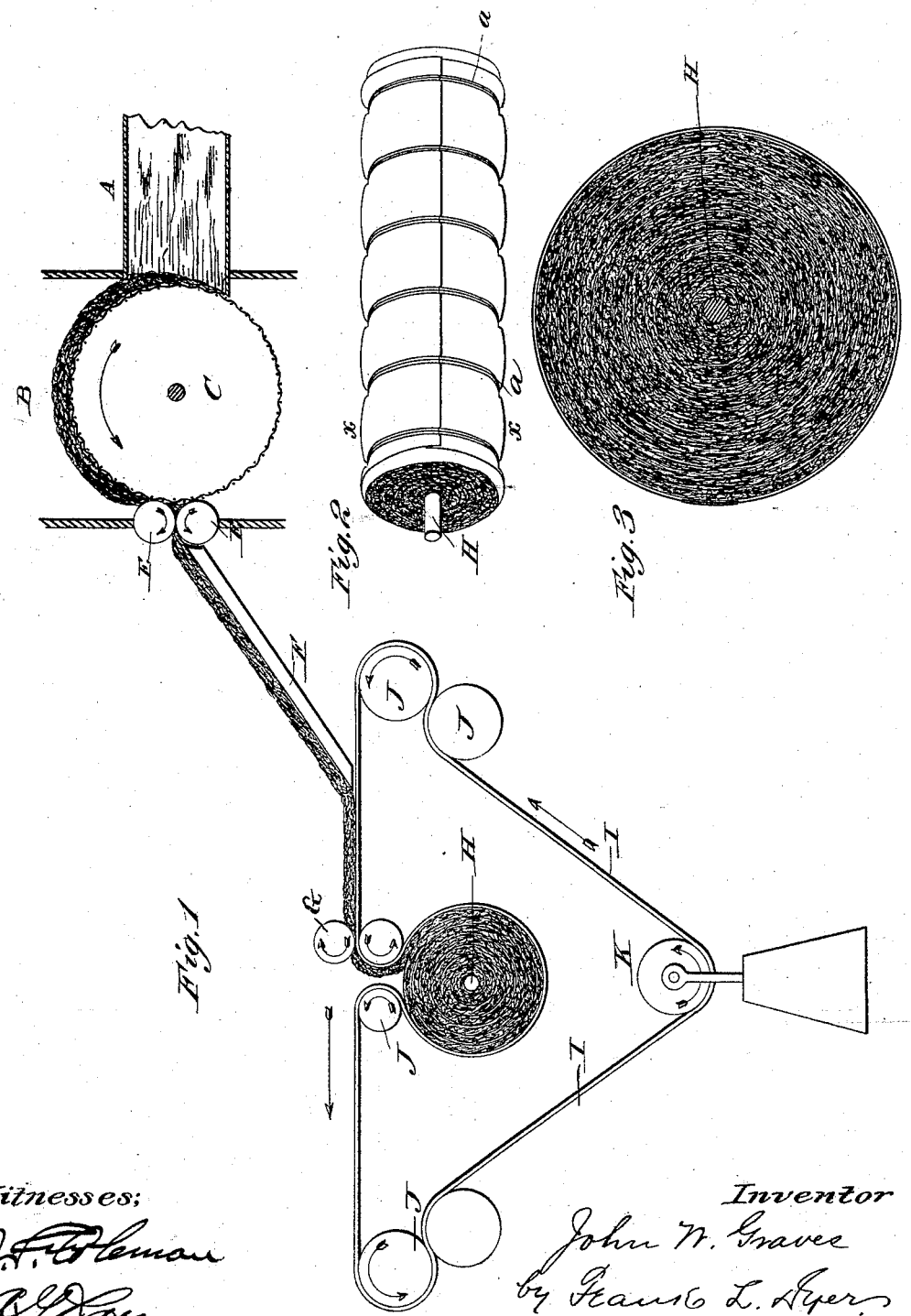

UNITED STATES PATENT OFFICE.

JOHN W. GRAVES, OF LITTLE ROCK, ARKANSAS, ASSIGNOR TO JAMES K. JONES, OF SAME PLACE, JANE LANIGAN, OF FORT SMITH, ARKANSAS, (EXECUTRIX OF THOMAS LANIGAN, DECEASED,) AND WILLIAM E. ANDERSON, OF WASHINGTON, DISTRICT OF COLUMBIA.

CYLINDRICAL COTTON-BALE AND METHOD OF MAKING SAME.

SPECIFICATION forming part of Letters Patent No. 546,009, dated September 10, 1895.

Application filed January 24, 1895. Serial No. 536,129. (No model.)

*To all whom it may concern:*

Be it known that I, JOHN W. GRAVES, a citizen of the United States, residing at Little Rock, in the county of Pulaski and State of Arkansas, have invented certain new and useful Improvements in Cylindrical Cotton-Bales and Methods of Making the Same; and I do hereby declare the following to be a full, clear, and exact description of the invention, which will enable others skilled in the art to which it appertains to make and use the same.

My invention relates to an improved cylindrical cotton-bale and to the method of making the same. Broadly considered, my improved cylindrical cotton-bale may be described as being composed of a continuous bat or sheet of cotton wound spirally upon a spindle or core, each layer being tightly compressed and held in this condition, the whole being wound with some covering material, such as canvas, and being bound with ties or bands. A cotton-bale thus made will be of an approximately uniform density throughout, and therefore will be of a maximum weight per unit of volume. For this reason cotton baled in this way can be stored better and more closely than when put up in ordinary bales, wherein the density is not approximately uniform throughout. By forming a cotton bale of a continuous sheet or bat wound spirally around a spindle and with each layer tightly compressed upon the layers nearer the center, as stated, the said bat or sheet can be entirely unwound into the opening-machines of a spinning establishment, and the necessity of first tearing up the bale and feeding the same into said opening-machines by hand, as is now done, is overcome. By making a cylindrical cotton-bale, as described, of an approximately uniform density throughout all the layers of the bale will tend to bind and retain those nearer the center, and when the wrapping or covering is removed the bale will not expand to an appreciable extent. Therefore when the bale is made even of only a comparatively moderate density it is practically fireproof, as will be fully explained.

The method which I have invented for making my improved cylindrical cotton-bale consists in winding a continuous sheet or bat spirally around a spindle or core while being subjected to continuous pressure, in subsequently covering the bale with a suitable wrap or cover, and, if necessary, in providing the same with ties or bands, the latter operations being preferably performed while the cotton is still subjected to pressure in the press.

For a better comprehension of my invention attention is directed to the accompanying drawings, forming a part of this specification, and in which—

Figure 1 is a diagrammatic view of a convenient form of apparatus for carrying out my improved method. Fig. 2 is a perspective view of the completed bale, and Fig. 3 is an enlarged sectional view taken on the line $x\,x$ of Fig. 2.

Referring to Fig. 1, A is the ordinary chute from the gin or gins leading into the condenser B. C is the ordinary condensing-cylinder, made of wire-gauze or similar material. E E are the usual doffer-rollers, mounted in the front wall of the condenser, for drawing off the bat from the condensing-cylinder. F is an inclined guide or way for receiving the bat from between the rollers E E. G is a pressure-roller mounted above the immovable upper roll J for compressing the bat before entering the press. H is a removable spindle or core upon which the bale is formed, said spindle or core being capable of movement downward. I is an endless traveling belt of sufficient width to receive the sheet or bat of cotton and surrounding the spindle H in the form of a loop or bight, as shown, said belt being adapted to partially encircle the bale and apply pressure thereto. J J J J are guide-rollers for supporting and guiding said endless traveling belt, and K is a tension-roller within said belt for applying pressure thereon. Power for driving said belt may be applied to any or all of said guide-rollers J, or said belt may be driven in any other way. One of the upper guide-rollers J may be made to move laterally in suitable guides in the direction of the arrow, whereby the opening between said upper guide-rollers may be sufficiently enlarged to allow for the removal of the bale.

While I prefer to make use of a press employing an endless traveling compressing-belt for the formation of my improved cylindrical bale and for the carrying out of the improved method of making the same, yet I desire to have it understood that any other form of apparatus by which said method can be carried out and by which the said improved bale can be produced can be employed without departing in any way from the essential spirit of my present invention.

With such an apparatus as I have shown in Fig. 1 my improved method of making cylindrical cotton-bales is carried out substantially as follows: Power is applied to the condensing-cylinder C, to the rollers E E, to the compressing-roller G, and to the belt I, so that the said parts will travel in the direction of the arrows indicated, respectively, thereon. The peripheries of the condensing-cylinder and rollers and the belt itself should preferably travel at the same rate of speed, whereby the bat will remain intact and unbroken, although this is not strictly necessary. The cotton from the gin or gins is now blown through the chute A in the form of flakes, as is now done, upon the condensing-cylinder C, and the bat L is formed thereon, the thickness of the bat depending, of course, on the number of gins employed and the peripheral speed of the condensing-cylinder. This bat is taken off of the condensing-cylinder C by the rollers E E, by which it is more or less compressed, and passes down the inclined guide F beneath the compression-roller G, by which it is tightly compressed. The effect of this compression is to expel air out of the sheet or bat and to give it smoothness and strength, whereby it will unwind better from the completed bale. If desired, this latter compression-roller may be dispensed with and the bat passed directly from the condenser to the press. From the compression-roller G the compressed bat is introduced between the two upper guide-rollers J J, and thence passes between the belt I and the spindle H. This belt I being caused to travel, as stated, and being normally in contact with said spindle, revolves said spindle by friction and causes the bat to be spirally wound thereon, said bat being subjected to the pressure of said belt. As the bat accumulates on said spindle and the bale begins to increase in size the loop of the belt, which partially surrounds the bale, will be gradually distended and the tension-roller K will be slowly elevated. In this way pressure will be applied to each layer of the bat as it passes around the bale being formed, and this pressure is not released until the bale has been completed. When a sufficient quantity of cotton has been thus wound in the form of a bat or sheet upon the spindle H, the bat is preferably cut off by stopping the condensing-cylinder C or otherwise and a wrap or covering of any suitable material, preferably canvas, is allowed to be wound around the bale by the movement of said belt I, the pressure being constantly imposed thereon. Simultaneously with the wrapping or covering of the bale, as explained, or afterward, as may be desired, a sufficient number of ties or bands (see $a\,a$, Fig. 2) are passed and allowed to be wound around the bale, also by the movement of said belt, and said bands or ties are secured in any suitable way, preferably while the bale is in the press. One of the upper rolls J is now moved laterally in the direction of the arrow above the same, and, the spindle H having first been released, the completed bale having the spindle H therein is removed from the press and is finished. If a press using a traveling endless compression-belt I is employed, it is obvious that instead of applying power to said belt power may be applied to the spindle H, in the latter case it being necessary to provide some means for maintaining a constant peripheral speed of the bale.

The completed bale of cotton is of the general appearance illustrated in Fig. 2, and it will be composed, as will be understood, of a continuous sheet or bat wound spirally upon the spindle H, each layer being tightly compressed upon the layers nearer the spindle, the whole being wound or covered with a wrapping or covering and being tied or secured by bands or ties $a$.

By subjecting the bat to pressure during the entire formation of the bale it can be entirely unwound from the spindle H at the spinning establishment in a continuous unbroken sheet, whereby the necessity of first tearing up the bale and subsequently feeding it by hand into the opening-machines of the spinning establishment, as is now the practice, is done away with. By allowing the spindle or core to remain within the completed bale, whereby it constitutes a part thereof, the said spindle or core offers a convenient means for supporting the bale when it is desired to unwind the bat or sheet therefrom, as explained. By applying pressure at all times to said bat or sheet, as stated, a cotton-bale will be produced which will be of an approximately uniform density throughout, and hence will be of a maximum weight per unit of volume. For this reason cotton formed into bales such as I have invented can be stored with better facility and more closely than when formed into ordinary bales. By making a cylindrical bale of a substantially uniform density throughout, as stated, and by compressing each layer, so that it tends to prevent the expansion of the layers nearer the center, the bale will not expand appreciably even when the wrap and ties are removed, and for this reason a cylindrical cotton-bale such as I have described, if attacked by fire, can be burned only on the outside, since the interior of the bale, being free of air, will not support combustion.

I am aware that prior to my invention the generic idea of forming a cylindrical cotton-bale had been suggested; but, so far as I know, in all of the presses for making such cylindrical cotton-bales the bat or sheet was not subjected to continuous pressure at all stages of its formation, and said bat or sheet could not, therefore, be unwound entirely from the bale in an unbroken condition. Therefore in the cylindrical cotton-bales as suggested prior to my invention it was impossible to produce a bale of substantially uniform density throughout. Since such prior cotton-bales, as stated, were not of an approximately uniform density throughout, the inner portions thereof being in a substantially uncompressed condition, and hence having considerable air therein, it followed that in case of fire the inner portions of the bales at first would be consumed, and that when such inner portions had burned out the outer layers would expand inwardly, thereby allowing the entire bale to be destroyed.

Having now described my invention, what I claim as new, and desire to secure by Letters Patent, is as follows:

1. The method of making cylindrical cotton bales, which consists in first forming a continuous sheet or bat of cotton, then in forming said sheet or bat into a roll which is continuously rotated so as to wind the sheet or bat spirally thereon layer upon layer, and in subjecting the sheet or bat to heavy pressure as each layer is wound in place on the roll, whereby a bale of cotton will be produced which will be in a tightly compressed condition throughout, and from which the said sheet or bat may be entirely unwound in a continuous unbroken condition, substantially as set forth.

2. The method of making cylindrical cotton bales, which consists in first forming a continuous sheet or bat of cotton, then in forming said sheet or bat into a roll which is continuously rotated so as to wind the sheet or bat spirally thereon layer upon layer, the sheet or bat being subjected to heavy pressure as each layer is wound in place on the roll, and finally, and when the roll is subjected to pressure, in applying and securing a covering to the completed bale to prevent expansion thereof, whereby a bale of cotton will be produced which will be in a tightly compressed condition throughout and from which the sheet or bat may be entirely unwound in a continuous unbroken condition, substantially as set forth.

3. The method of making cylindrical cotton bales, which consists in first forming a continuous sheet or bat of cotton, then in forming said sheet or bat into a roll which is continuously rotated so as to wind the sheet or bat spirally thereon layer upon layer, and in subjecting said sheet or bat to heavy pressure as it is wound in place on the roll so as to expel all air out of the same, whereby a bale of cotton will be produced which will be substantially fire proof, substantially as set forth.

4. The method of making cylindrical cotton bales, which consists in first forming a continuous sheet or bat of cotton, then in subjecting said sheet or bat to a preliminary compression, whereby air is expelled out of the same, and strength and smoothness imparted to the sheet or bat, then in forming said compressed sheet or bat into a roll which is continuously rotated so as to wind the compressed sheet or bat spirally thereon layer upon layer, and in subjecting the said sheet or bat to a second and final compression as it is wound in place on the roll, so as to expel any air from the bat or sheet not expelled by the preliminary compression, whereby a bale of cotton will be produced which will be substantially fire proof, substantially as set forth.

5. As a new article of manufacture, an improved cotton bale composed of a continuous sheet or bat of cotton wound in spiral form, and with each layer in a tightly pressed condition, whereby a bale will be produced which will be of an approximately uniform density throughout, and from which the said sheet or bat may be entirely unwound in a continuous unbroken condition, substantially as set forth.

6. As a new article of manufacture, an improved cotton bale composed of a continuous sheet or bat of cotton from which all air has been expelled, wound in spiral form and subjected to pressure, whereby a bale will be produced which will be substantially fire-proof and from which the said sheet or bat may be unwound in a continuous unbroken condition, substantially as set forth.

7. As a new article of manufacture, an improved cotton bale composed of a continuous sheet or bat of cotton from which all air has been expelled, wound in spiral form, and with each layer in a tightly pressed condition, whereby a bale will be produced which will be of an approximately uniform density throughout, which will be substantially fire-proof, and from which the said sheet or bat may be entirely unwound in a continuous unbroken condition, substantially as set forth.

8. As a new article of manufacture, an improved cotton bale composed of a continuous sheet or bat of cotton wound in spiral form, and with each layer in a tightly pressed condition, whereby a bale will be produced which will be of an approximately uniform density throughout, and from which the said sheet or bat may be entirely unwound in a continuous unbroken condition, the bale being covered or wrapped with a covering or wrapping applied under pressure, substantially as set forth.

9. As a new article of manufacture, an improved cotton bale composed of a continuous sheet or bat of cotton wound in spiral form, and with each layer in a tightly pressed condition whereby a bale will be produced which will be of an approximately uniform density throughout, and from which the said sheet or bat may be entirely unwound in a continuous unbroken condition, the bale being covered or wrapped with a covering or wrapping and tied or bound with ties or bands applied under pressure, substantially as set forth.

10. As a new article of manufacture, an improved cotton bale composed of a spindle or core, with a continuous sheet or bat of cotton wound thereon in spiral form, and with each layer in a tightly pressed condition, whereby a bale will be produced which will be of an approximately uniform density throughout, and from which the said sheet or bat may be entirely unwound in a continuous unbroken condition, substantially as set forth.

In testimony whereof I affix my signature in presence of two witnesses.

JOHN W. GRAVES.

Witnesses:
CHARLES H. SMITH,
P. M. HOEFELE.